US012608825B2

(12) United States Patent
Shevelev et al.

(10) Patent No.: US 12,608,825 B2
(45) Date of Patent: Apr. 21, 2026

(54) PREPARING DATA FOR HIGH-PRECISION ABSOLUTE LOCALIZATION OF A MOVING OBJECT ALONG A TRAJECTORY

(71) Applicant: Oracle International Corporation, Redwood Shores, CA (US)

(72) Inventors: Oleg Gennadievich Shevelev, Chislehurst (GB); Sahil Malhotra, Hampton (GB); Sergio Aldea Lopez, Valladolid (ES); Matthew Charles Rowe, Milton Keynes (GB); Alberto Polleri, London (GB)

(73) Assignee: Oracle International Corporation, Redwood Shores, CA (US)

( * ) Notice: Subject to any disclaimer, the term of this patent is extended or adjusted under 35 U.S.C. 154(b) by 199 days.

(21) Appl. No.: 18/367,415

(22) Filed: Sep. 12, 2023

(65) Prior Publication Data

US 2025/0086810 A1 Mar. 13, 2025

(51) Int. Cl.
G06T 7/292 (2017.01)
G06F 17/12 (2006.01)

(52) U.S. Cl.
CPC .............. G06T 7/292 (2017.01); G06F 17/12 (2013.01); *G06T 2207/20081* (2013.01); *G06T 2207/30241* (2013.01)

(58) Field of Classification Search
CPC ........... G06T 7/292; G06T 2207/20081; G06T 2207/30241; G06F 17/12

(Continued)

(56) References Cited

U.S. PATENT DOCUMENTS

| | | | |
|---|---|---|---|
| 6,169,952 | B1 | 1/2001 | Matsuda |
| 11,600,017 | B2 | 3/2023 | Chidlovskii |

(Continued)

FOREIGN PATENT DOCUMENTS

| | | |
|---|---|---|
| CN | 114549661 | 5/2022 |
| EP | 2821751 A1 | 1/2015 |

(Continued)

OTHER PUBLICATIONS

Li, Shaosong, et al. "Dynamic trajectory planning and tracking for autonomous vehicle with obstacle avoidance based on model predictive control." Ieee Access 7 (2019): 132074-132086. (Year: 2019).*

(Continued)

*Primary Examiner* — Jonathan S Lee

(74) *Attorney, Agent, or Firm* — Hickman Becker Bingham Ledesma LLP

(57) ABSTRACT

Techniques for preparing data for high-precision absolute localization of a moving object along a trajectory are provided. In one technique, a sliding window of a set of adjacent points along a trajectory of a moving object is identified, along with a midpoint in the sliding window. Based on the set of adjacent points, a first polynomial equation is generated for a first dimension and a second polynomial equation is generated for a second dimension. A (Continued)

first derivative at a particular timestamp associated with the midpoint is a first velocity along the first dimension, while a particular first derivative at the particular timestamp is a second velocity along the second dimension. A velocity in direction of yaw is generated based on the first velocity, the second velocity, and a slip angle associated with the midpoint. A yaw angle is generated based on the velocity in direction of yaw.

20 Claims, 8 Drawing Sheets

(58) Field of Classification Search
USPC ......................................................... 382/103
See application file for complete search history.

(56) References Cited

U.S. PATENT DOCUMENTS

| | | | |
|---|---|---|---|
| 12,051,283 | B1 | 7/2024 | Gataric |
| 2008/0275602 | A1 | 11/2008 | Peake |
| 2011/0153267 | A1 | 6/2011 | Peeters |
| 2018/0236937 | A1 | 8/2018 | Utter |
| 2019/0147221 | A1 | 5/2019 | Grabner |
| 2020/0302634 | A1 | 9/2020 | Pollefeys |
| 2022/0097714 | A1 | 3/2022 | Reshef |
| 2022/0319047 | A1 | 10/2022 | Urtasun et al. |
| 2022/0343601 | A1 | 10/2022 | Liaudanskas |
| 2023/0135242 | A1 | 5/2023 | Ito |

FOREIGN PATENT DOCUMENTS

| | | |
|---|---|---|
| WO | WO-2018067473 A1 | 4/2018 |
| WO | WO2020/0182297 | 9/2020 |

OTHER PUBLICATIONS

Artuñedo, Antonio, Jorge Villagra, and Jorge Godoy. "Jerk-limited time-optimal speed planning for arbitrary paths." IEEE Transactions on Intelligent Transportation Systems 23.7 (2021): 8194-8208. (Year: 2021).*
Parque et al., "Smooth Curve Fitting of Mobile Robot Trajectories Using Differential Evolution", IEEE Access, IEEE, USA, vol. 8, Apr. 28, 2020, pp. 82855-82866.
Li et al., "Rollover-Free Path Planning for Off-Road Autonomous Driving", Electronics, vol. 8, No. 6, May 31, 2019. 22 pages.
Kothe, "Reliable Low-Level Image Analysis", Sep. 21, 2007, pp. 1-318; available: URL:https://hci.iwr.uni-heidelberg.de/system/files/private/downloads/687822792/koethe_08_reliable-image-analysis.pdf.
Hery et al., "Map-based Curvilinear Coordinates for Autonomous Vehicles", 2017 IEEE 20th International Conference on Intelligent Transportation Systems, Oct. 16, 2017, pp. 1-7, XP033330435.
Vishal et al., "Accurate localization by fusing images and GPS signals." Proceedings of the IEEE Conference on Computer Vision and Pattern Recognition Workshops. 2015.
En et al. "RPNet: An end-to-end Network for Relative Camera Pose Estimation." Proceedings of the European Conference on Computer Vision (ECCV) Workshops. (Year: 2018).

* cited by examiner

200

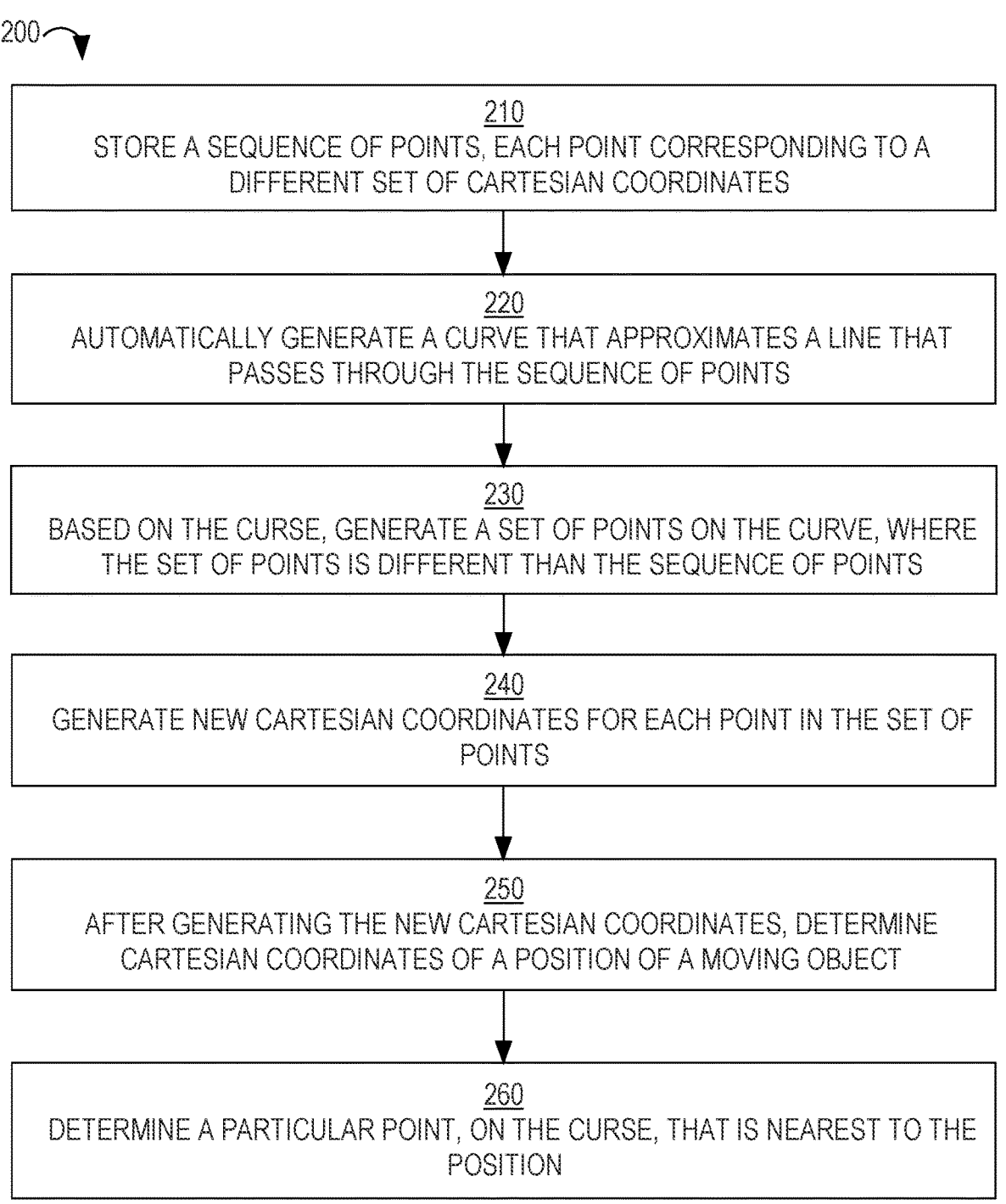

210
STORE A SEQUENCE OF POINTS, EACH POINT CORRESPONDING TO A DIFFERENT SET OF CARTESIAN COORDINATES

220
AUTOMATICALLY GENERATE A CURVE THAT APPROXIMATES A LINE THAT PASSES THROUGH THE SEQUENCE OF POINTS

230
BASED ON THE CURSE, GENERATE A SET OF POINTS ON THE CURVE, WHERE THE SET OF POINTS IS DIFFERENT THAN THE SEQUENCE OF POINTS

240
GENERATE NEW CARTESIAN COORDINATES FOR EACH POINT IN THE SET OF POINTS

250
AFTER GENERATING THE NEW CARTESIAN COORDINATES, DETERMINE CARTESIAN COORDINATES OF A POSITION OF A MOVING OBJECT

260
DETERMINE A PARTICULAR POINT, ON THE CURSE, THAT IS NEAREST TO THE POSITION

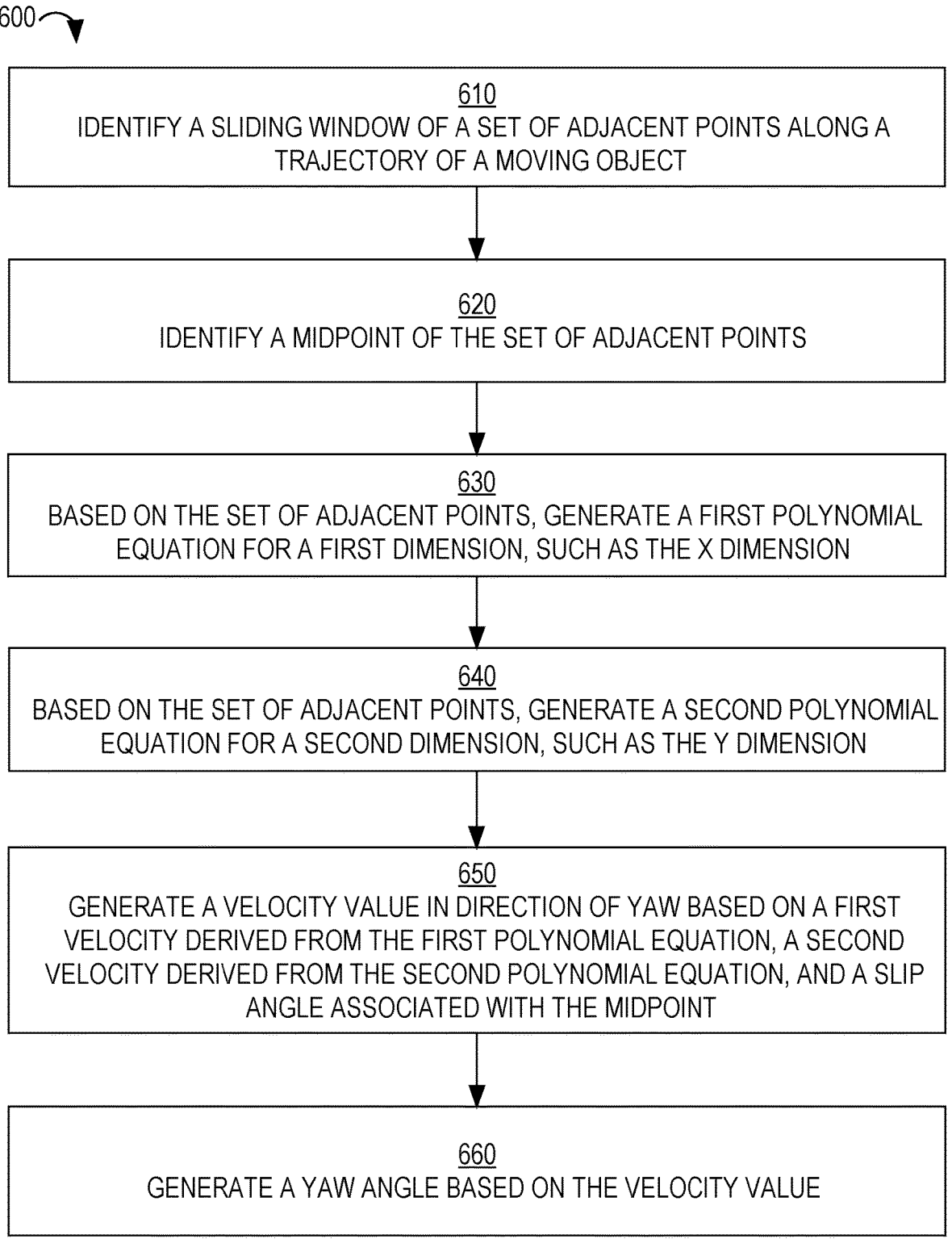

610
IDENTIFY A SLIDING WINDOW OF A SET OF ADJACENT POINTS ALONG A TRAJECTORY OF A MOVING OBJECT

620
IDENTIFY A MIDPOINT OF THE SET OF ADJACENT POINTS

630
BASED ON THE SET OF ADJACENT POINTS, GENERATE A FIRST POLYNOMIAL EQUATION FOR A FIRST DIMENSION, SUCH AS THE X DIMENSION

640
BASED ON THE SET OF ADJACENT POINTS, GENERATE A SECOND POLYNOMIAL EQUATION FOR A SECOND DIMENSION, SUCH AS THE Y DIMENSION

650
GENERATE A VELOCITY VALUE IN DIRECTION OF YAW BASED ON A FIRST VELOCITY DERIVED FROM THE FIRST POLYNOMIAL EQUATION, A SECOND VELOCITY DERIVED FROM THE SECOND POLYNOMIAL EQUATION, AND A SLIP ANGLE ASSOCIATED WITH THE MIDPOINT

660
GENERATE A YAW ANGLE BASED ON THE VELOCITY VALUE

PREPARING DATA FOR HIGH-PRECISION ABSOLUTE LOCALIZATION OF A MOVING OBJECT ALONG A TRAJECTORY

RELATED CASE

This application is related to U.S. patent application Ser. No. 18/210,506, filed on Jun. 15, 2023 and U.S. patent application Ser. No. 18/367,400, filed on Sep. 12, 2023, and is incorporated by reference as if fully set forth herein.

TECHNICAL FIELD

The present disclosure relates to object localization and, more particularly, to preparing data for high-precision absolute localization of a moving object along a trajectory.

BACKGROUND

Raw path data that describes a moving object's trajectory, obtained by sensors installed on the object (e.g., a vehicle), is rarely, if ever, sufficient for high-precision absolute localization of a moving object along a trajectory, or reference line. A reference line is a continuous curve of arbitrary length defined by a series of closely located points in Cartesian coordinates. A reference line itself requires heavy pre-processing, and the poses of the object (position and the orientation) require adjustment, extension, and transformation.

Describing an object's position using Cartesian coordinates is commonplace but may not always be optimal for certain tasks. In the context of Visual Odometry (VO) and Simultaneous Localization and Mapping (SLAM), if moving objects are tracked using Cartesian coordinates, errors in estimations can cause the moving objects to drift outside of a possible path or road, which is defined by a reference line. This happens because it is computationally intensive, both manually and for machine learning models, to constrain object movement in Cartesian coordinates if the reference line has a complex geometry, e.g., if the line includes sharp and repeated turns in different directions and variety of angles. The task would entail solving polynomials with very large coefficients, which could significantly impact the efficiency of the model.

However, using reference line-based coordinates provides a moving object's position relative to the reference line, adding internal constraints to the model that help maintain touch with reality and, ultimately, can substantially simplify the calculations and ensure more reliable and accurate results. A firm anchor to the reference line also aids in post-processing and analysis of results. Many use cases related to the planning, prediction, and analysis of the trajectory of moving objects benefit from the use of reference line-based coordinates. A reference line-based coordinate system has proven to be useful for trajectory representation for objects, such as robots and self-driving cars, in the last few years. Such a system is of great importance in settings where the object trajectory geometry is predetermined, repetitive (with the object following the same path repeatedly), and subject to infrequent modifications. Example settings include racing tracks, automated guided vehicles (AGVs), autonomous farming equipment, and aerial vehicles following a flight path.

A reference line-based coordinate system consists of a longitudinal displacement s (how far the object is from the beginning of the reference line along this line) and lateral displacement d (how far the object is from the reference line laterally). Much real-life data comes in Cartesian (x, y) or geographic (longitude and latitude) coordinate systems. While the conversion from geographic to Cartesian is trivial, the conversion from Cartesian to reference line is not. Many available solutions for the conversion of Cartesian coordinates to reference line-based coordinates are either incomplete (i.e., necessary steps are omitted) or have poor accuracy. This presents a significant obstacle for many applications where precise tracking of the vehicle position and orientation is critical for safe and reliable operation.

Another problem with raw data is that the most convenient orientation measure-yaw angle, which measures the orientation of a moving object around the yaw axis of the moving object as it changes the direction to which it is pointing, to the left or right in the direction of motion-often is not provided due to the physical difficulties in measuring it. Direct transformation of the more commonly given slip angle and a series of object coordinates to absolute yaw angle is possible but such direct transformation introduces other issues including the discontinuity of absolute yaw over a value of 0 (i.e., it is difficult to decide where the angle changes sign) and a loss of precision due to the accumulation of errors from individual errors of coordinates and the slip angle, and transformations between these. Predicting the difference in yaw angles between frames of the same and different video footages helps with the accuracy of predictions and avoid issues with discontinuity of the absolute angle. However, if the difference is calculated from initial absolute yaw values, it still suffers from discontinuity and multiple transformations introduce additional minute errors, which are critical when predicting minute yaw differences (i.e., tens or hundreds of a degree).

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 2 is a flow diagram that depicts an example process for generating a reference line, in an embodiment;

FIG. 6 is a flow diagram that depicts an example process for extending image data with kinematic values, in an embodiment;

FIG. 8 is a block diagram of a basic software system that may be employed for controlling the operation of the computer system.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A system and method for preparing data for high-precision absolute localization of an object moving along a trajectory are provided. In a real-life scenario, input localization data is rarely smooth and consistent; thus, it requires preparation. Embodiments offer specific steps for this process. In one technique, raw data is received that comprises a sequence of points in Cartesian space. Based on the raw data, a curve is generated that approximates a line that passes through or near the sequence of points. Based on the curve, a set of points on the curve is generated. Each adjacent pair of points in the set of points may be separated by the same fixed distance. Then, new Cartesian coordinates are generated for each input in the set of points. Given Cartesian coordinates of a position of a moving object, a point that is nearest to the position on the curve is determined.

Embodiments improve computer-related technology, namely, absolute localization of moving objects. Embodiments are superior to existing approaches because embodiments offer a robust and highly accurate transformation from Cartesian coordinates to a reference line: robust in that embodiments can process an input from any curve without giving unexpected wrong results; high accuracy in that the conversion to a reference line and then back to Cartesian coordinates gives the same original Cartesian coordinates. In other words, the conversion introduces no distortion.

System Overview

Figure 1:
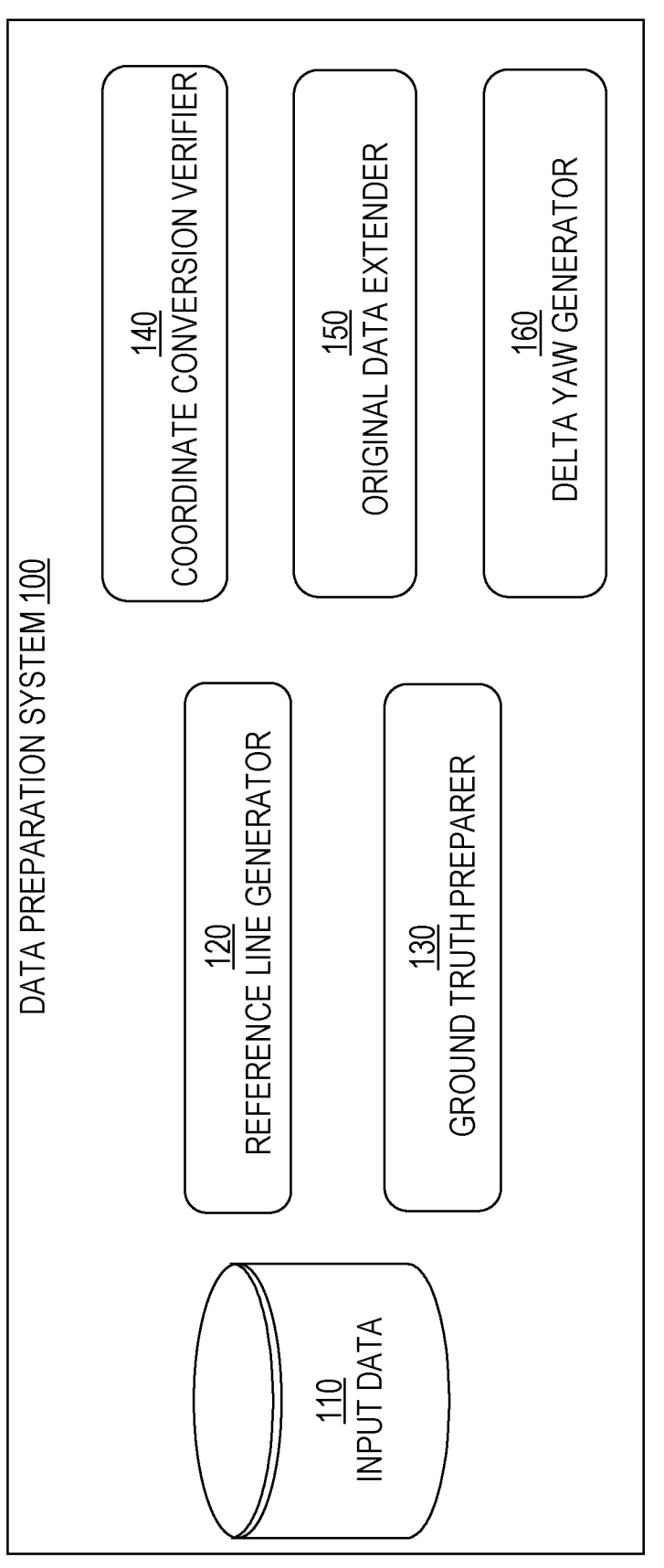
FIG. 1 is a block diagram that depicts an example system for modifying input data into a state that increases the accuracy of methods for absolute localization of a moving object along a trajectory defined by a reference line, in an embodiment.

FIG. 1 is a block diagram that depicts an example system 100 for modifying input data into a state that increases the accuracy of methods for absolute localization of a moving object along a trajectory defined by a reference line, in an embodiment.

System 100 comprises input data 110, a reference line generator 120, a ground truth preparer 130, a coordinate conversion verifier 140, a kinematic value generator 150, and a delta yaw generator 160. Each of reference line generator 120, ground truth preparer 130, coordinate conversion verifier 140, kinematic value generator 150, and delta yaw generator 160 may be implemented in software, hardware, or any combination of software and hardware.

Input data 110 comprises two types of data: path data (or data used to generate a reference line for a reference line-based coordinate system) and original movement data from which ground truth data is generated in order to train one or more machine-learned models. Path data may comprise one or more sets of position data, where each set of position data defines a path and direction of a moving object, such as a vehicle on a race track, an autonomous ariel vehicle, or a mobile robot in a warehouse. This path may be referred to as R, or path R. Thus, data about the movement of a single moving object may be used to formulate path R. Alternatively, path data is artificially generated, such as via computation of an optimal path to follow from point A to point B in a given scenario or location. For example, path data may be static data that defines a track, such as the track's center line.

A set of position data may be stored as an array or vector of values. A set of position data comprises, for each position in the set, location data, which may be geographic data or Cartesian coordinates in an arbitrary plane or space. If location data is geographic data, then the geographic (e.g., GPS) data may comprise, for each position, a longitude value and a latitude value. In the scenario where a set of position data defines path R, reference line generator 120 (or another component of system 100) may convert the geographic data to Cartesian coordinates. For example, the first position may be mapped to (0, 0) in Cartesian space and each unit in the x and y directions may have units that are equal to the units that are being predicted, such as feet, meters, or centimeters. In the context of a race track, position data may be a series of GPS coordinates that were generated as a vehicle was driven once around a race track down the center of the race track. Original movement data may also comprise a set of position data for each of one or more moving objects along with an image for each position.

Reference Line Generator

Reference line generator 120 may comprise multiple sub-components, such as a position deduplicator 122, a position smoother 124, a curve generator 126, and a unit vector generator 128. Reference line generator 120 may comprise more or fewer sub-components. For example, the operations that are described as being performed by one of these sub-components may be performed by other sub-components.

Position deduplicator 122 analyzes a set of position data from input data 110 and identifies any duplicate positions and removes the duplicate positions. Duplicate positions are two positions that have the same or identical location data. For example, two or more positions in a set of position data may have the same Cartesian coordinates or may have the same sets of GPS values. If that is the case, position deduplicator 122 identifies the one or more duplicates and removes those duplicates. Prior to removing duplicates, position deduplicator 122 may first determine whether a duplicate position is adjacent to the position that the duplicate position matches. If two positions have the same value but are not adjacent to each other in the set of position data (i.e., there are one or more positions between those two positions in the position data), then that may mean a path that the moving object traveled turned back in on itself, such as in a loop of a figure eight track. In such a scenario, position deduplicator 122 may only analyze a set of position data for duplicate positions that are adjacent to each other. In some instances, position deduplicator 122 may identify zero duplicates in a set of position data. In another embodiment, position deduplicator 122 does not execute at all with respect to a set of position data.

Position smoother 124 adjusts one or more positions in a set of position data (whether deduplicated or not). Position smoother 124 "smooths" a set of position data using a low pass filter, an example of which is a Butterworth filter. Smoothing the set of position data removes undesirable, irregular oscillations, which may be due to (a) equipment that produces imprecise location data and/or (b) an object operator that causes the object to not move on a smooth curve in space, such as a vehicle driver that makes frequent and unnecessary movements of the steering wheel. Parameters of Butterworth filter include a filter order, a filter critical frequency, a filter method, and filter padding. Examples of values of those parameters include, respectively, 3, 0.1, Gustafsson, and no filter padding. A result of the smoothing is a coarse reference line.

Position smoother 124 (or another component of reference line generator 120, such as curve generator 126) determines a length (L) of the coarse reference line that is defined by a smoothed set of position data. Such a determination involves computing a (e.g., Euclidean) distance between each pair of adjacent positions in the smoothed set of position data and summing (or totaling) the computed distances.

Curve generator 126 generates a curve R* (or "smooth R") based on path R, or the coarse reference line, where each point in the line is evenly spaced in the longitudinal dimension. In order to get these points, a smooth B-spline curve G(r) is fitted to the points of the coarse reference line. Then, curve generator 126 creates an array of distances S from the starting point of the curve R at every $\Delta s$ distance (e.g., [0, $\Delta s$, $2*\Delta s$, $3*\Delta s$, . . . ]) until the length of the coarse reference line. S contains the longitudinal positions of an imaginary object that traverses the curve R*, where all the positions are evenly distributed on curve R*. The smaller the value of $\Delta s$, the more precise, but more expensive in time and computing resources, will be the calculation of an absolute position of a moving object relative to curve R*. An example $\Delta s$ is one centimeter, which may represent a balance between computational time and desired accuracy, depending on the hardware that is employed to process data relative to curve R*. Thus, curve R* may have many more points associated with curve R* than the number of points/positions in the original coarse reference line R, which is used to generate curve R*.

Curve generator 126 (or another component of reference line generator 120), generates new Cartesian coordinates (i.e., (x, y) for each value in array S using R*. To generate these new points, curve generator 126 evaluates the spline curve G(r) for each of the values in array S. The resulting points describe a path in the curve R*. If curve R* has a length of ten and each $\Delta s$ is one, then an array S=[0, 1, 2, 3, 4, 5, 6, 7, 8, 9, 10]. Curve R* has a beginning, so the first point (x, y) corresponds to S[0], the second point (x, y) corresponds to S[1], and so forth. In this way, a set of points (x, y) in the Cartesian space are obtained, equally distanced from each other on curve R*.

In an embodiment, curve generator 126 (or another component of reference line generator 120) generates two one-dimensional (1D) cubic splines $C_{S,R}{}^{x}$ and $C_{S,R}{}^{y}$, which interpolate values of each dimension (x, y) of R* for values in S.

In an embodiment, a two-dimensional K-D tree is generated for each pair of (x, y) coordinates in R*. The K-D tree is later used to identify the closest point on R* given an input Cartesian position. An alternative to a K-D tree is a binary tree.

Unit vector generator 128 generates the unit vectors $d^{x}$ and $d^{y}$ and other values for each pair of adjacent points in R*. Unit vectors are vectors of length 1. The resulting unit vectors are used to generate two one-dimensional (1D) cubic splines $C_{S,d}{}^{x}$ and $C_{S,d}{}^{y}$, which interpolate values of each of the unit vectors $d^{x}$ and $d_{y}$ for values in S.

In order to generate $C_{S,d}{}^{x}$ and $C_{S,d}{}^{y}$, the following values are calculated:

a. the distances between adjacent points, for each coordinate separately: $\Delta x_{r}=x_{r}-x_{r-1}$ and $\Delta y_{r}=y_{r}-y_{r-1}$.

b. the angle of the normal vector at $(x_{r}, y_{r})$: $\theta_{r}$=arctan $(\Delta y_{r}, \Delta x_{r})+\pi/2$ c. $s_{r}$, which is the longitudinal distance (or $D(x_{r}, y_{r})$) from the beginning of reference line R* to the $(x_{r}, y_{r})$ point along the reference line R*.

d. $d^{x}_{r-1}=\cos(\theta_{r})$, where $d^{x}_{r-1}$ is a unit vector at point (r−1) in the x-axis.

e. $d^{y}_{r-1}=\sin(\theta_{r})$, where $d^{y}_{r-1}$ is a unit vector at a point (r−1) in the y-axis.

Each point in reference line R* has a 1D unit vector in each dimension: x and y. Unit vectors $d^{x}_{r-1}$ and $d^{y}_{r-1}$ are later used in the conversion from a reference line coordinate system to a Cartesian coordinate system. When converting back to Cartesian, each dimension is computed separately, first considering s, and then adjusting accordingly based on d.

The data generated by reference line generator 120 is used for the conversion between a Cartesian-based coordinate system and a reference line-based coordinate system.

Example Process

FIG. 2 is a flow diagram that depicts an example process 200 for generating and using a reference line, in an embodiment. Process 200 may be performed by different components of system 100, such as reference line generator 120.

At block 210, a sequence of points is stored, each point corresponding to a different set of Cartesian coordinates. The sequence of points may have been generated by a GPS receiver that is attached to a moving object, the GPS receiver generating geographical coordinates every time interval, such as every second or every thirty milliseconds. Alternatively, the sequence of points may instead be an arbitrarily defined line that might be an optimal path based on one or more criteria, such as time, distance, or difficulty. Thus, block 210 may also involve converting geographical coordinates to Cartesian coordinates.

At block 220, a curve is automatically generated that approximates a line that passes through the sequence of points. An error may be calculated that represents a cumulative difference between each point (in the sequence of points) and the closed position (to that point) on the curve.

At block 230, based on the curve, a set of points on the curve is generated. The set of points is different than the sequence of points. In fact, many or most of the points in the set of points might not match or equal any point in the (original) sequence of points. The set of points may be generated such that the distance between each adjacent pair of points in the set of points is equal or substantially equal (e.g., such that the difference between any two distances is less than 1% of the smallest distance).

At block 240, new Cartesian coordinates are generated for each point in the set of points. Like blocks 210-230, block 240 may be performed by reference line generator 120.

At block 250, after generating the new Cartesian coordinates, Cartesian coordinates of a position of a moving object is determined. Block 250 may involve a computing device, on the moving object, transmitting geographic data over a wireless network to a server computer that converts the geographic data to Cartesian coordinates and sends the Cartesian coordinates to system 100 or another computer system that has a copy of the set of points and corresponding Cartesian coordinates.

At block 260, a particular point, on the curve, is determined that is nearest to the position. Block 260 may involve a component of system 100 (e.g., ground truth preparer 130) or the other computer system calculating the particular point based on the determined Cartesian coordinates. Block 260 may be performed using one of the techniques described herein.

Ground Truth Preparer

The techniques described as follows presume that the ground truth data (that will be used to train a machine-learned model) of the trajectory of each moving object is defined by a sequence of poses, each pose including Cartesian (x, y) coordinates, a slip angle of the moving object, and a timestamp of the pose. The distance between adjacent poses can vary depending on the number of frames per second (FPS) captured by a video camera. Example FPS cameras are 30 FPS cameras and 60 FPS cameras. Embodiments are not limited to these specific FPS values and can process images from video cameras having potentially very different FPSs.

At a high level, ground truth preparations involve extending each pose of original video footage (x, y, slip angle, and time stamp) with new values that will be later used to train a machine-learned model. The following is a listing of variables and their corresponding definitions:

a. s (distance on reference line R*)
b. d (lateral distance with respect to reference line R*)
c. v (velocity), $\alpha$ (acceleration), and $\zeta$ (jerk) for each coordinate (x and y)
d. $\theta$ (yaw).
e. $v^\theta$ (velocity in the direction of yaw)

Figure 3:
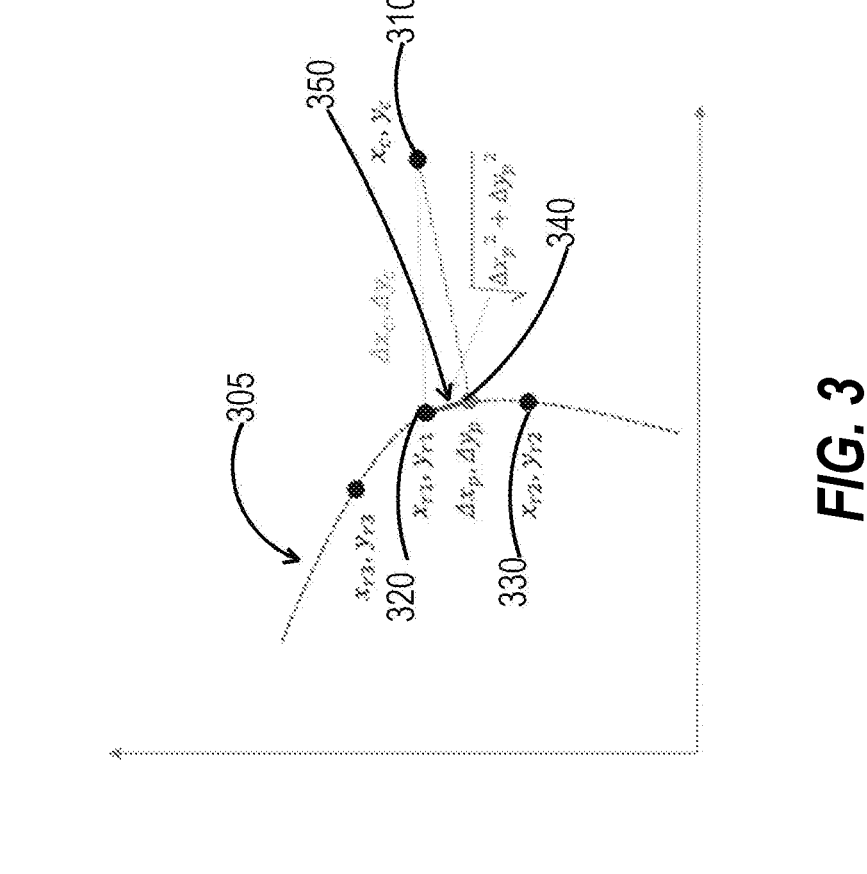
FIG. 3 is a chart that depicts a generated reference line and how a corresponding point on the reference line may be determined based on a position of a moving object, in an embodiment.

Ground truth preparer 130 calculates or computes, given Cartesian coordinates (i.e., (x, y)) of a ground truth image, the values of s and d for those coordinates. In other words, ground truth preparer 130 converts the Cartesian coordinates into reference line-based coordinates (s, d). The calculation of s (or the distance from the start of reference line R*) is as follows. FIG. 3 is a chart that depicts a generated reference line 305 and how a corresponding point on reference line 305 may be calculated based on a position of a moving object, in an embodiment.

The moving object's coordinates at position c (which may be very far from reference line R*) are referred to as $(x_c, y_c)$ and are indicated by point 310.

The closest point 320 $(x_{r1}, y_{r1})$ on reference line R* is identified using the K-D tree on $(R^*_x, R^*_y)$. Searching the K-D tree is a binary search in 2D space, encoded by the K-D tree.

The second closest point 330 $(x_r^*, y_r^*)$ on reference line R* is identified. This may be performed by: (1) identifying the adjacent following point $(x_{r3}, y_{r3})$ on reference line R* from point 320 $(x_{r1}, y_{r1})$; (2) computing a (Euclidean) distance from point 310 $(x_c, y_c)$ to the following point; (3) identifying the adjacent previous point $(x_{r2}, y_{r2})$ on reference line R* from point 320 $(x_{r1}, y_{r1})$; (4) computing a (Euclidean) distance from point 310 $(x_c, y_c)$ to the previous point; and (5) determining which distance is shorter. The adjacent point that has a shorter distance to point 310 $(x_c, y_c)$ becomes the second closest point $(x_r^*, y_r^*)$. If reference line R* is circular, then the next point can become the first point of reference line R* (if the closest point is at the end of R*), and the previous point can become the last point of reference line R* (if the closest point is at the beginning of reference line R*). Based on experiments, identifying and leveraging the second closest point in order to determine s has a significant impact on accuracy of the s value.

Given the closest and second closest points on reference line R*, delta values on reference line R* are computed:

$$\Delta x_r = x_{r^*} - x_{r1} \qquad \text{a.}$$

$$\Delta y_r = y_{r^*} - y_{r1} \qquad \text{b.}$$

Then, the distance of the moving object from the closest point is computed:

$$\Delta x_c = x_c - x_{r1} \qquad \text{a.}$$

$$\Delta y_c = y_c - y_{r1} \qquad \text{b.}$$

From these values, the projection norm (N) is computed:

The coordinates of the projected point 340 $(x_p, y_p)$ on reference line R* may be calculated as follows:

$$\Delta x_p = N^* \Delta x_r \qquad \text{a.}$$

$$\Delta y_p = N^* \Delta y_r \qquad \text{b.}$$

Figure 4:
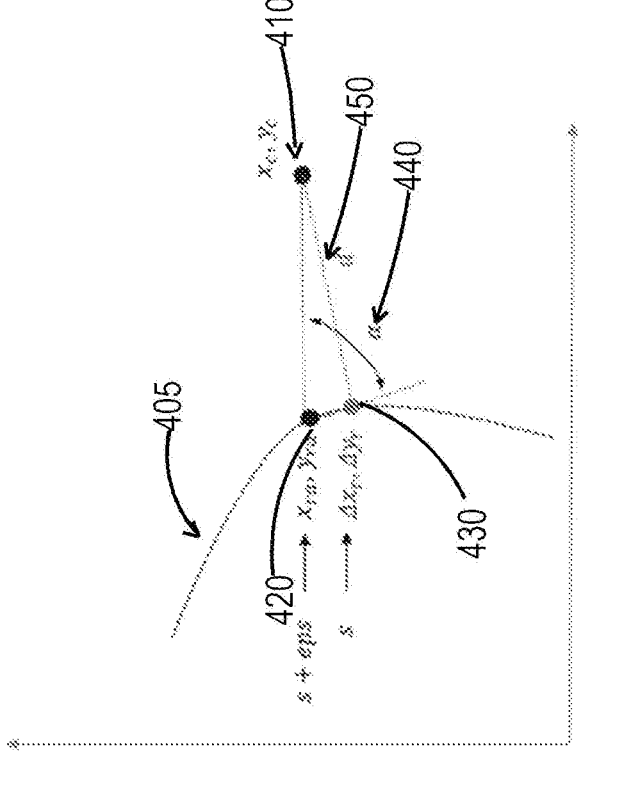
FIG. 4 is a diagram that depicts how a lateral distance of a moving object from a reference line may be determined, in an embodiment.

From these two values, $S_c$ may be calculated by first identifying the first point $(s_{p1})$ on the reference line R* by its index. Point $s_{p1}$ corresponds to the longitudinal distance of the closest point 320 $(x_{r1}, y_{r1})$ on the reference line R*. Then:

a. $s_c = s_{p1} + (\Delta x_p^2 + \Delta y_p^2)^{1/2}$ (where $(\Delta x_p^2 + \Delta y_p^2)^{1/2}$ is the length of segment 350 on reference line R* 305) if the second closest point is after the closest point (i.e., the second closest point has a higher index in the array of reference line R*'s points)
  i. if $s_c > L$ (i.e., the length of reference line R*) and R* is circular, then $s_c = s_c - L$
b. $s_c = s_{p1} - (\Delta x_p^2 + \Delta y_p^2)^{1/2}$ if the second closest point is before the closest point
  i. if $s_c < 0$ and R* is circular, then $s_c = s_c + L$ The calculation of d (lateral distance) is as follows and as depicted in FIG. 4:

a. First, the moving object's $s_c$ position 410 is identified, using one of the techniques described herein.
b. Second, using the value of $s_c$ and the reference line splines $C_{S,Rx}$ and $C_{S,Ry}$, a point 430 $(x_r, y_r)$ on reference line R* 405 is identified.
c. Third, $d_c$ 450 is computed, where $d_c = ((x_c - x_r)^2 + (y_c - y_r)^2)^{1/2}$ and where de represents a lateral distance from the point on reference line R* 405. However, at this stage of the calculation of d, it is not known which side of reference line R* that the moving object is found. The next two steps are used to determine on which side of reference line R* that the moving object is found.
d. Fourth, a point 420 ahead on reference line R* is determined. This point is referred to as $(x_{ra}, y_{ra})$ using s+ε, where ε is a small step on reference line R* 405, such as 0.5 meters.
e. Fifth, an angle 440 $\alpha$ between vectors $[(x_c, y_c), (x_{ra}, y_{ra})]$ and $[(x_r, y_r), (x_{ra}, y_{ra})]$ is calculated. If $\alpha < 0$, then $d_c = -d_c$. Thus, the angle determines if the moving object is to the left side or right side of reference line R* 405.

Given the above steps that ground truth preparer 130 performs relative to each image that is used to train a machine-learned model, each image may be associated with the proper reference line coordinates (s, d).

Coordinate Conversion Verifier

In an embodiment, system 100 includes coordinate conversion verifier 140, which verifies that reference line coordinates can be converted back to the original Cartesian coordinates. Coordinate conversion verifier 140 performs this verification prior to training the machine-learned model. Such verification may also be used to apply to the predictions of the machine-learned model in reference line coordinates if the result must be in Cartesian coordinates.

Given a reference line coordinates $s_c$ and de, reflecting some point in a moving object's trajectory, Cartesian coordinates for $s_c$ are identified using splines that were pre-calculated in the first stage pertaining to reference line generator 120:

a. $x_r = C_{S,Rx}(s_c)$, which is a function that, upon calling, uses interpolation to find the value $x_r$ given the longitudinal distance $s_c$.

b. $y_r = C_{S,Ry}(s_c)$, which is the same as above, except on the y-axis.

Then, the Cartesian coordinates of the moving object (i.e., $(x_c, y_c)$) are calculated by shifting by $d_c$, as follows:

$$x_c = x_r + C_{S,dx}(s_c)*(-d_c) \qquad \text{a.}$$

$$y_c = y_r + C_{S,dy}(s_c)*(-d_c) \qquad \text{b.}$$

Coordinate conversion verifier 140 may compare these (a) output Cartesian coordinates with (b) original Cartesian coordinates that were used to generate the reference line coordinates that were input to coordinate conversion verifier 140. If the two sets of Cartesian coordinates are identical or within an acceptable threshold of each other (e.g., <1% difference), then the conversion is verified.

Extending the Data with Kinematic Values and Yaw

At this stage, the original training data (e.g., stored in input data 110 and comprising multiple images, each representing a pose of a moving object, being associated with a timestamp and spatial (e.g., geographic) coordinates, and facing a certain direction) is extended with kinematic values and yaw angle (generated by kinematic value generator 150) for each pose in a sequence of poses of a moving object's trajectory. Example kinematic parameters include velocity, acceleration, and jerk. This new data is helpful for the machine-learned model to make better predictions, necessary for the precise calculations of delta yaw angles between poses, and can be used to evaluate predicted trajectories.

Embodiments described hereafter may be used independent of a system that generates and leverages a reference line and converts Cartesian coordinates to reference line coordinates.

In order to generate kinematic values, a preliminary step is to select a sliding window size (w) that indicates a number of adjacent poses along a moving object's trajectory. Example values of w include five and three, although a window of three does not allow for the calculation of jerk. Thus, if the sliding window size is five, then kinematic values for the first two poses and the last two poses in a series of poses cannot be calculated. However, a sliding window of three may be chosen for the first three poses in a series of poses and for the last three poses in the series of poses. This means that only the first pose and the last pose in the series of poses will not have velocity or acceleration values calculated for them.

Figure 5:
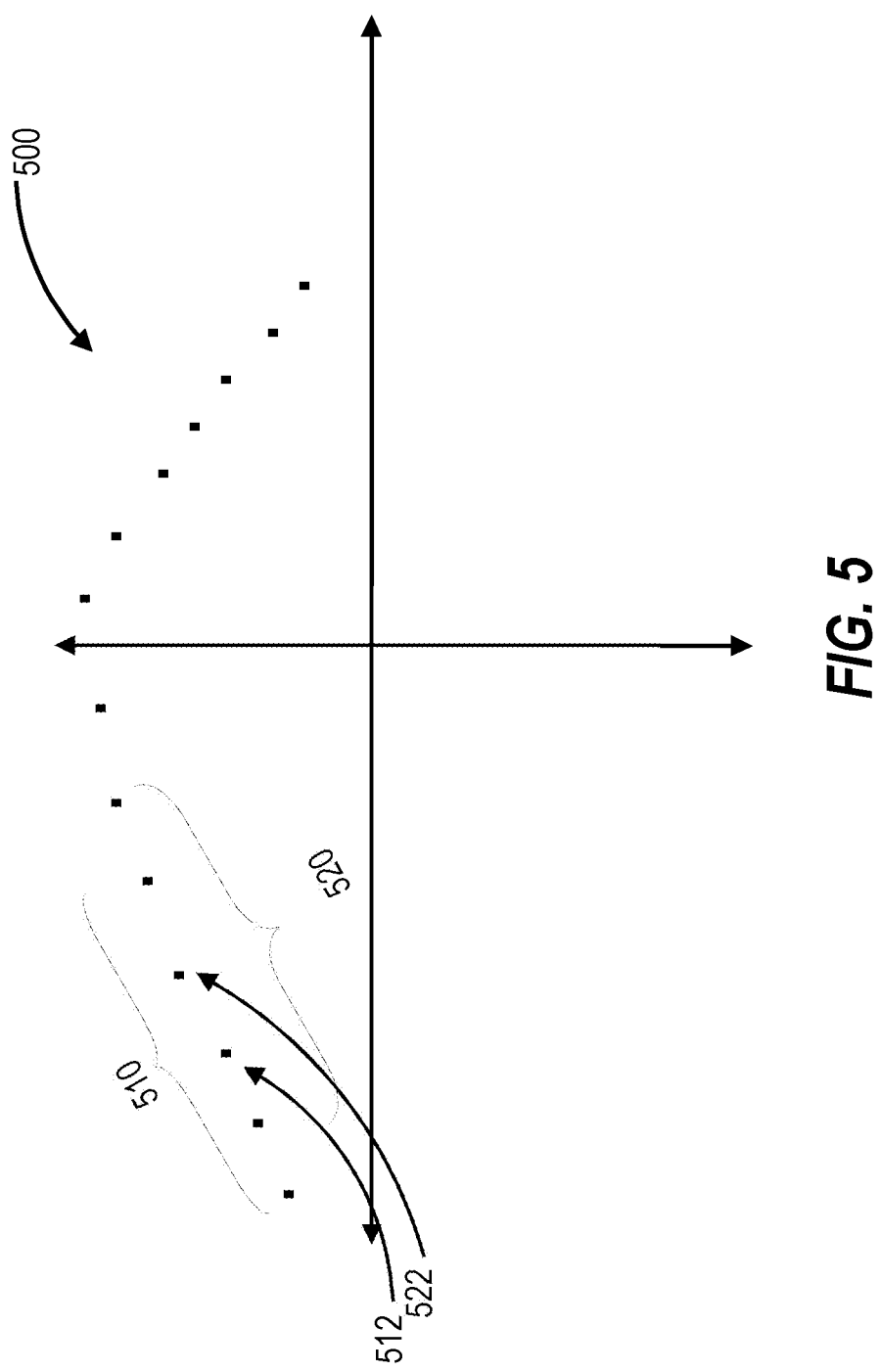
FIG. 5 is a diagram that depicts a process for generating kinematic values using this sliding window approach, in an embodiment.

FIG. 5 is a diagram that depicts a process for generating kinematic values using this sliding window approach, in an embodiment. FIG. 5 depicts several points 500 in Cartesian space, each point corresponding to a position of a moving object. An example distance between positions is one meter, although embodiments are not limited to that distance. At time equal to the $5^{th}$ point, the current window is the first set of five poses 510. At time equal to the $6^{th}$ point, the current window is the second set of five poses 520.

Once a size of a sliding window is determined, one of the points within a window is chosen as an index, such as the midpoint of the window. For example, if the midpoint is selected as the index and the window size is five, then the third pose in a set of five adjacent poses is selected as the midpoint. In FIG. 5, the midpoint of window 510 is point 512, while the midpoint of window 520 is point 522.

Once the midpoint is selected, then a pose and timestamp of the corresponding of the midpoint is identified, the timestamps in the window are offset to that the midpoint has timestamp of 0, poses temporally before the midpoint pose have a negative timestamp, and poses temporally after the midpoint pose have a positive timestamp.

Once the timestamp offsets have been determined, a cubic polynomial is fit on the points of the window, where each point has two values: a modified timestamp and the x coordinate from the Cartesian coordinates of the image/pose that corresponds to the point. This cubic polynomial is a motion equation. (The larger the window, the smoother the polynomial.) According to properties of the equation, the value of the equation at timestamp T is a newly calculated x (which is simply evaluating the cubic polynomial at T=0), the $1^{st}$ derivative at timestamp T is velocity (v), the $2^{nd}$ derivative at timestamp T is acceleration (a), and the $3^{rd}$ derivative at timestamp T is jerk ($\zeta$). To be clear, a polynomial equation is generated for each window and the purpose of each polynomial is to generate kinematic characteristics for the midpoint in the corresponding windows. The exact value T of a midpoint does not matter, which is why timestamps of all points in a window may be offset by $-T$, making the timestamp of the midpoint 0. Making the timestamp of the midpoint 0 simplifies the calculations and makes each polynomial more robust. One or more of these values may be useful for training a model and verifying the predictions of relative or absolute poses.

One or more of these derivatives are calculated for timestamp 0 (midpoint). Doing so will give a new x, plus velocity, acceleration, and jerk on x. The value of x is updated to new x to be consistent with the generated kinematic values.

The same process to calculate one or more of these kinematic values for the x coordinate is repeated for the y coordinate. Thus, for each image in a training image set that is used to train a machine-learned model, the above process for calculating a set of kinematic values for a set of points is performed twice: once for the x coordinate and once of the y coordinate.

With the above process, values for the velocity in the x direction/dimension and the velocity in the y direction/dimension are calculated and known. The "slip angle" is the angle between the direction in which a moving object is facing (or in which a camera on the moving object is facing/pointing) and the direction in which the moving object is traveling. Thus, a moving object may be sliding on a surface moving in one direction but facing a (e.g., very) different direction. Velocity of a moving object in the direction of yaw (or the direction the object is moving) can be calculated using slip angle and the calculated velocities of the x and y coordinates:

a.

$$v^{\beta} = \begin{pmatrix} v^{\beta x} \\ v^{\beta y} \end{pmatrix} = \begin{pmatrix} v^x \\ v^y \end{pmatrix} \cdot \begin{pmatrix} \cos(\beta) & -\sin(\beta) \\ \sin(\beta) & \cos(\beta) \end{pmatrix} = v.R^{\beta},$$

where $v^\theta$ is the velocity vector in the direction of yaw, B is the slip angle, $\theta$ is the yaw, and v is the velocity vector in the Cartesian space, and RB is the rotation matrix that is applied to v to orient the vehicle with respect to the slip angle direction.

The yaw angle may then be computed as follows:

a.

$$\theta = \arctan(v^{\theta y}, v^{\theta x})$$

where $v^{\theta x}$ and $v^{\theta y}$ are velocities in the direction of yaw by x and y respectively.

The calculations for the pose/image corresponding to the index (e.g., midpoint) of the sliding window result in at least velocity and yaw angle values. This process repeats by moving the sliding window by one point/pose and repeating the calculations for the next 5 points. This process repeats for every set of five adjacent poses (in a series of poses) until the end of the moving object's trajectory has been reached. One benefit of fitting polynomials to each set of adjacent points is that the angles became much more consistent and did not fluctuate significantly from point to point. This consistency allows the machine-learned model to learn better and output better predictions of where one object is relative to another object.

FIG. 6 is a flow diagram that depicts an example process 600 for extending image data with kinematic values, in an embodiment. Process 600 may be implemented by kinematic value generator 150 and may be performed prior to the training of a machine-learned model that is used to localize (e.g., in real-time) moving objects in the future.

At block 610, a sliding window of a set of adjacent points along a trajectory of a moving object is identified. The size of the sliding window may be a default value or pre-defined. The trajectory is defined by a series of points in Cartesian space, each point having Cartesian coordinates. The series of points may be stored in input data 110 or another database or storage location.

At block 620, a midpoint of the set of adjacent points is identified. Similar to the sliding window size, the midpoint may be a default value or pre-defined.

At block 630, based on the set of adjacent points, a first polynomial equation is generated for a first dimension (such as the x dimension). A first value of the first polynomial equation at a particular timestamp associated with the midpoint is a first newly calculated position value along the first dimension, while a first derivative at the particular timestamp is a first velocity along the first dimension.

At block 640, based on the set of adjacent points, a second polynomial equation is generated for a second dimension (such as the y dimension). A second value of the second polynomial equation at the particular timestamp is a second newly calculated position value along the second dimension and a first derivative at the particular timestamp is a second velocity along the second dimension.

At block 650, a velocity value in direction of yaw is generated based on the first velocity, the second velocity, and a slip angle associated with the midpoint. Block 650 may be performed using matrix multiplication, where one of the matrices comprises the velocity values in the x and y directions and where the other matrix comprises sine and cosine values that are based on the slip angle.

At block 660, a yaw angle is generated based on the velocity in the direction of yaw. Block 660 may be performed by computing the arctangent of two velocities: one in the x direction and the other in the y direction.

Blocks 610-660 may be performed for each successive set of adjacent points along the trajectory. Thus, if there are N points in a series of points of the trajectory, blocks 610-660 may be performed N–4 times relative to the points in the trajectory.

Precision Calculation of Delta Yaw

One of the outputs of the machine-learned model as described in U.S. patent application Ser. No. 18/210,506 is delta yaw (or $\Delta\theta$). Given two input frames (one of which is a reference frame and the other of which is a new frame) and data about those input frames into the machine-learned model, a delta position (or a difference in position of the two frames) and a delta yaw (or difference in yaw angles of the two frames) are output. This is repeated for multiple reference frames and the same new frame. The outputs are aggregated (e.g., averaged) in order to generate a final predicted position of the new frame.

In order to train such a machine-learned model to output delta yaw values, accurate delta yaw values are necessary as labels in the training set. However, generating accurate delta yaw values has proven to be difficult. Multiple chained conversions of values from one format to another can lead to an accumulation of errors. For example, there is a common problem with the cosine function: small angles have a cosine value close to 1, which makes it difficult to resolve angles from numerical values close to 1.

To avoid computational issues, delta yaw generator 160 may implement the following formula, which uses only the inverse tangent and the initial velocities in the direction of yaw for the computation of yaw differences. Delta yaw generator 160 generates (or computes) a delta yaw value via a series of mathematical and trigonometric transformations:

$$\Delta\theta = \arctan\left(\frac{v_i^{\theta x} v_j^{\theta y} - v_i^{\theta y} v_j^{\theta x}}{v_i^{\theta x} v_j^{\theta x} + v_i^{\theta y} v_j^{\theta y}}\right)$$

where i and j indicate frame numbers, corresponding to different poses or images. Frames i and j can be taken from the same trajectory (of the same moving object) or from different trajectories, which can correspond to different moving objects. If velocities in the direction of yaw are provided, then the difference between their yaw angle values can be calculated. Instead of or in addition to using these generated delta yaw values to train a machine-learned model, these generated delta yaw values may be used outside of an ML context, such as extending the set of variables that describe the movement of an object. Delta yaw values along with the output of kinematic value generator 150 creates a comprehensive description of a moving object.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
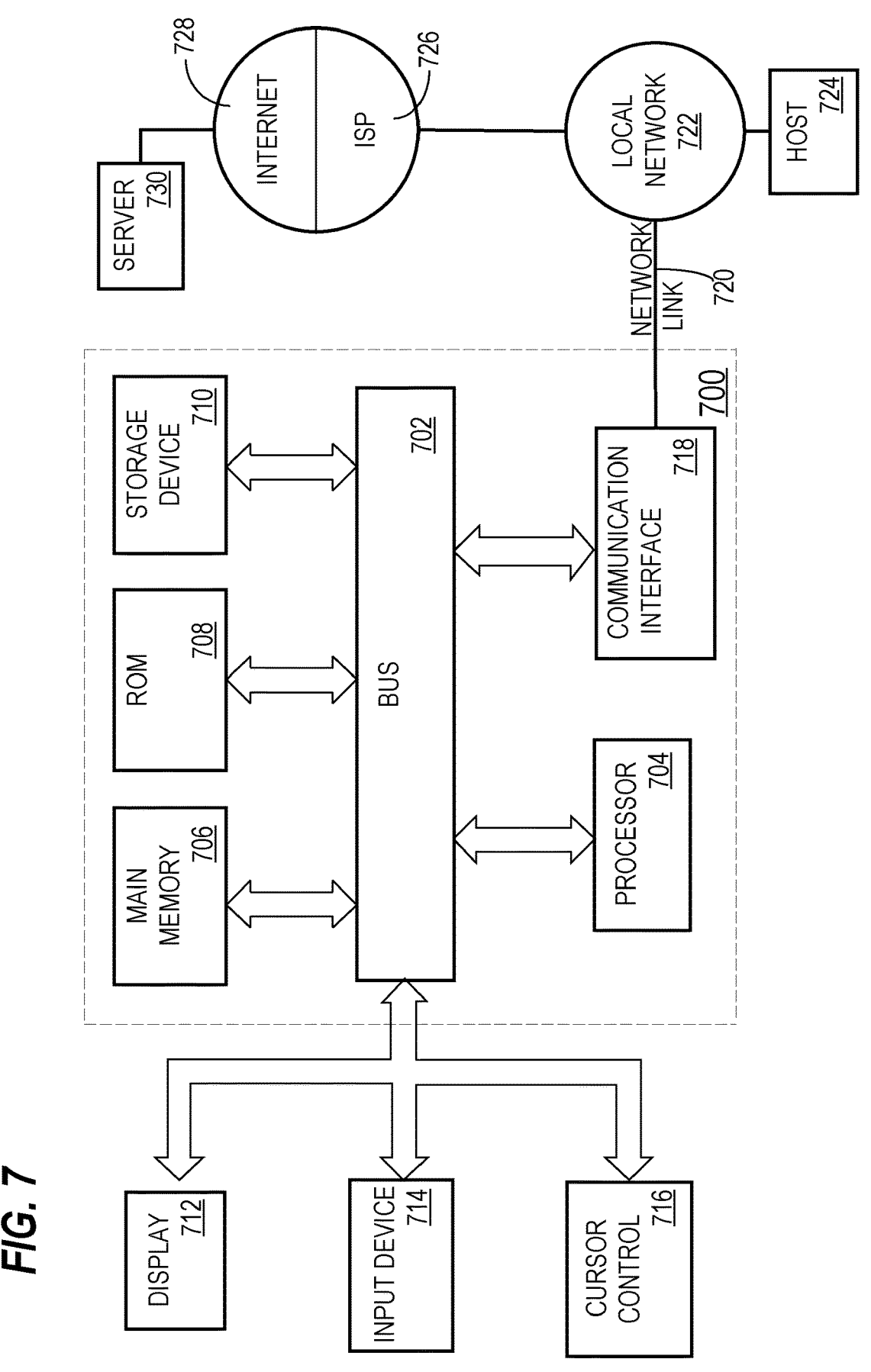
FIG. 7 is a block diagram that illustrates a computer system upon which an embodiment of the invention may be implemented.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk, optical disk, or solid-state drive is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 710. Volatile media includes dynamic memory, such as main memory 706. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic, or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the worldwide packet data communication network now commonly referred to as the "Internet" 728. Local network 722 and Internet 728 both use electrical, electromagnetic, or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

Software Overview

Figure 8:
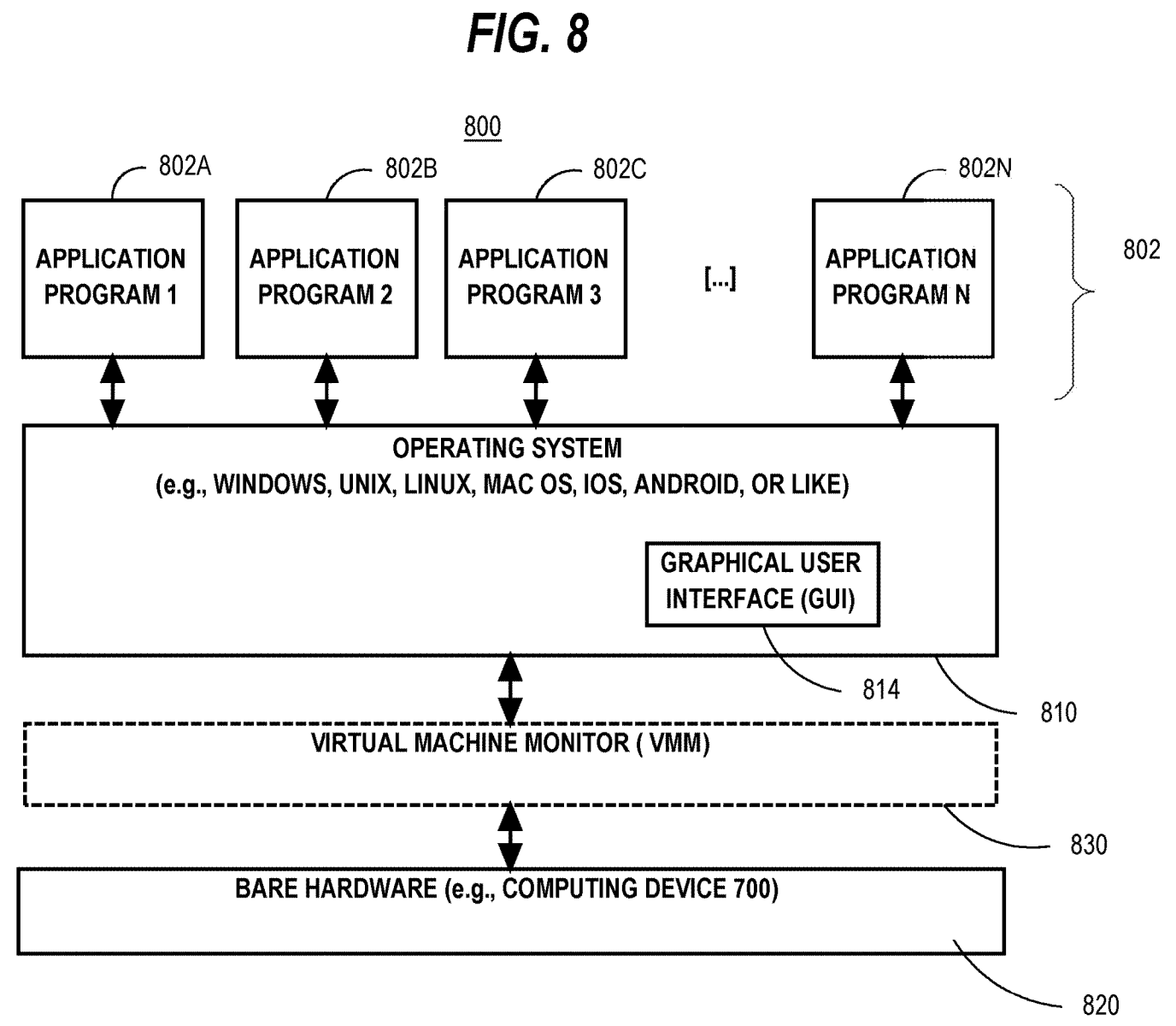

FIG. 8 is a block diagram of a basic software system 800 that may be employed for controlling the operation of computer system 700. Software system 800 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 800 is provided for directing the operation of computer system 700. Software system 800, which may be stored in system memory (RAM) 706 and on fixed storage (e.g., hard disk or flash memory) 710, includes a kernel or operating system (OS) 810.

The OS 810 manages low-level aspects of computer operation, including managing execution of processes, memory allocation, file input and output (I/O), and device I/O. One or more application programs, represented as 802A, 802B, 802C . . . 802N, may be "loaded" (e.g., transferred from fixed storage 710 into memory 706) for execution by the system 800. The applications or other software intended for use on computer system 700 may also be stored as a set of downloadable computer-executable instructions, for example, for downloading and installation from an Internet location (e.g., a Web server, an app store, or other online service).

Software system 800 includes a graphical user interface (GUI) 815, for receiving user commands and data in a graphical (e.g., "point-and-click" or "touch gesture") fashion. These inputs, in turn, may be acted upon by the system 800 in accordance with instructions from operating system 810 and/or application(s) 802. The GUI 815 also serves to display the results of operation from the OS 810 and application(s) 802, whereupon the user may supply additional inputs or terminate the session (e.g., log off).

OS 810 can execute directly on the bare hardware 820 (e.g., processor(s) 704) of computer system 700. Alternatively, a hypervisor or virtual machine monitor (VMM) 830 may be interposed between the bare hardware 820 and the OS 810. In this configuration, VMM 830 acts as a software "cushion" or virtualization layer between the OS 810 and the bare hardware 820 of the computer system 700.

VMM 830 instantiates and runs one or more virtual machine instances ("guest machines"). Each guest machine comprises a "guest" operating system, such as OS 810, and one or more applications, such as application(s) 802, designed to execute on the guest operating system. The VMM 830 presents the guest operating systems with a virtual operating platform and manages the execution of the guest operating systems.

In some instances, the VMM 830 may allow a guest operating system to run as if it is running on the bare hardware 820 of computer system 700 directly. In these instances, the same version of the guest operating system configured to execute on the bare hardware 820 directly may also execute on VMM 830 without modification or reconfiguration. In other words, VMM 830 may provide full hardware and CPU virtualization to a guest operating system in some instances.

In other instances, a guest operating system may be specially designed or configured to execute on VMM 830 for efficiency. In these instances, the guest operating system is "aware" that it executes on a virtual machine monitor. In other words, VMM 830 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

The above-described basic computer hardware and software is presented for purposes of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/ private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:

identifying a sliding window of a set of adjacent points along a trajectory of a moving object;

identifying a midpoint of the set of adjacent points;

based on the set of adjacent points, generating a first polynomial equation for a first dimension, wherein a first value of the first polynomial equation at a particular timestamp associated with the midpoint is a first newly calculated position value along the first dimension and a first derivative at the particular timestamp is a first velocity along the first dimension;

based on the set of adjacent points, generating a second polynomial equation for a second dimension that is different than the first dimension, wherein a second value of the second polynomial equation at the particular timestamp is a second newly calculated position value along the second dimension and a particular first derivative at the particular timestamp is a second velocity along the second dimension;

generating a velocity in direction of yaw based on the first velocity, the second velocity, and a slip angle associated with the midpoint;

generating a yaw angle based on the velocity in direction of yaw;

including the yaw angle in a training instance that includes an image representing a pose of the moving object;

wherein the method is performed by one or more computing devices.

2. The method of claim 1, wherein:

a second derivative at the particular timestamp of the first polynomial equation is a first acceleration along the first dimension;

a particular second derivative at the particular timestamp of the second polynomial equation is a second acceleration along the second dimension.

3. The method of claim 1, wherein:

a third derivative at the particular timestamp of the first polynomial equation is a first jerk along the first dimension;

a particular third derivative at the particular timestamp of the second polynomial equation is a second jerk along the second dimension.

4. The method of claim 1, further comprising:

identifying a second set of adjacent points along the trajectory of the moving object, wherein the second set of adjacent points includes a subset of the points in the set of adjacent points and includes at least one point that is not in the set of adjacent points;

identifying a second midpoint of the second set of adjacent points;

based on the second set of adjacent points, generating a first particular polynomial equation for the first dimension, wherein a first particular value of the first particular polynomial equation at a timestamp associated with the second midpoint is a first particular newly calculated position value along the first dimension and a particular first derivative at the timestamp is a third velocity along the first dimension;

based on the second set of adjacent points, generating a second particular polynomial equation for the second dimension, wherein a second particular value of the second particular polynomial equation at the timestamp is a second particular newly calculated position value along the second dimension and a certain first derivative at the timestamp is a fourth velocity along the second dimension;

generating a second particular velocity in direction of yaw based on the third velocity, the fourth velocity, and a second slip angle associated with the second midpoint;

generating a second yaw angle based on the second particular velocity in direction of yaw.

5. The method of claim 1, wherein generating the velocity in direction of yaw is also based on cosine of the slip angle and a sine of the slip angle.

6. The method of claim 1, wherein generating the yaw angle based on the velocity in direction of yaw comprises generating the yaw angle based on the velocity in direction of yaw along the first dimension and the velocity in the direction of yaw along the second dimension.

7. The method of claim 1, further comprising:

storing the velocity in direction of yaw and the yaw angle in association with a frame, of video, that is associated with the midpoint;

using one or more machine learning techniques to train a model based on the velocity in direction of yaw and the yaw angle.

8. The method of claim 1, further comprising:

selecting a first frame in first video footage;

selecting a second frame in second video footage;

generating a first velocity, along the first dimension, in the direction of yaw of a first moving object associated with the first frame;

associating the first velocity with the first frame;

generating a second velocity, along the second dimension, in the direction of yaw of the first moving object;

associating the second velocity with the first frame;

generating a first particular velocity, along the first dimension, in the direction of yaw of a second moving object associated with the second frame;

associating the first particular velocity with the second frame;

generating a second particular velocity, along the second dimension, in the direction of yaw of the second moving object;

associating the second particular velocity with the second frame;

generating a ratio based on the first velocity, the second velocity, the first particular velocity, and the second particular velocity;

generating a delta yaw value based on an inverse tangent of the ratio.

9. A method comprising:

selecting a first frame in first video footage;

selecting a second frame in second video footage;

generating a first velocity, along a first dimension, in the direction of yaw of a first moving object that is associated with the first frame;

generating a second velocity, along a second dimension, in the direction of yaw of the first moving object;

generating a first particular velocity, along the first dimension, in the direction of yaw of a second moving object that is associated with the second frame;

generating a second particular velocity, along the second dimension, in the direction of yaw of the second moving object;

generating a ratio based on the first velocity, the second velocity, the first particular velocity, and the second particular velocity;

generating a delta yaw value based on an inverse tangent of the ratio;

including the delta yaw value in a training instance for training a machine-learned model.

10. The method of claim 9, wherein the first video footage was captured from a first camera attached to a first moving object and the second video footage is captured from a second camera attached to a second moving object that is different than the first moving object.

11. The method of claim 9, further comprising:

using one or more machine learning techniques to train the machine-learned model based on the delta yaw value.

12. One or more non-transitory storage media storing instructions which, when executed by one or more computing devices, cause performance of the method recited in claim 9.

13. One or more non-transitory storage media storing instructions which, when executed by one or more computing devices, cause:

identifying a sliding window of a set of adjacent points along a trajectory of a moving object;

identifying a midpoint of the set of adjacent points;

based on the set of adjacent points, generating a first polynomial equation for a first dimension, wherein a first value of the first polynomial equation at a particular timestamp associated with the midpoint is a first newly calculated position value along the first dimension and a first derivative at the particular timestamp is a first velocity along the first dimension;

based on the set of adjacent points, generating a second polynomial equation for a second dimension that is different than the first dimension, wherein a second value of the second polynomial equation at the particular timestamp is a second newly calculated position value along the second dimension and a particular first derivative at the particular timestamp is a second velocity along the second dimension;

generating a velocity in direction of yaw based on the first velocity, the second velocity, and a slip angle associated with the midpoint;

generating a yaw angle based on the velocity in direction of yaw;

including the yaw angle in a training instance that includes an image representing a pose of the moving object.

14. The one or more storage media of claim 13, wherein:

a second derivative at the particular timestamp of the first polynomial equation is a first acceleration along the first dimension;

a particular second derivative at the particular timestamp of the second polynomial equation is a second acceleration along the second dimension.

15. The one or more storage media of claim 13, wherein:

a third derivative at the particular timestamp of the first polynomial equation is a first jerk along the first dimension;

a particular third derivative at the particular timestamp of the second polynomial equation is a second jerk along the second dimension.

16. The one or more storage media of claim 13, wherein the instructions, when executed by the one or more computing devices, further cause:

identifying a second set of adjacent points along the trajectory of the moving object, wherein the second set of adjacent points includes a subset of the points in the set of adjacent points and includes at least one point that is not in the set of adjacent points;

identifying a second midpoint of the second set of adjacent points;

based on the second set of adjacent points, generating a first particular polynomial equation for the first dimension, wherein a first particular value of the first particular polynomial equation at a timestamp associated with the second midpoint is a first particular newly calculated position value along the first dimension and a particular first derivative at the timestamp is a third velocity along the first dimension;

based on the second set of adjacent points, generating a second particular polynomial equation for the second dimension, wherein a second particular value of the second particular polynomial equation at the timestamp is a second particular newly calculated position value along the second dimension and a certain first derivative at the timestamp is a fourth velocity along the second dimension;

generating a second particular velocity in direction of yaw based on the third velocity, the fourth velocity, and a second slip angle associated with the second midpoint;

generating a second yaw angle based on the second particular velocity in direction of yaw.

17. The one or more storage media of claim 13, wherein generating the velocity in direction of yaw is also based on cosine of the slip angle and a sine of the slip angle.

18. The one or more storage media of claim 13, wherein generating the yaw angle based on the velocity in direction of yaw comprises generating the yaw angle based on the velocity in direction of yaw along the first dimension and the velocity in the direction of yaw along the second dimension.

19. The one or more storage media of claim 13, wherein the instructions, when executed by the one or more computing devices, further cause:

storing the velocity in direction of yaw and the yaw angle in association with a frame, of video, that is associated with the midpoint;

using one or more machine learning techniques to train a model based on the velocity in direction of yaw and the yaw angle.

20. The one or more storage media of claim 13, wherein the instructions, when executed by the one or more computing devices, further cause:

selecting a first frame in first video footage;

selecting a second frame in second video footage;

generating a first velocity, along the first dimension, in the direction of yaw of a first moving object associated with the first frame;

associating the first velocity with the first frame;

generating a second velocity, along the second dimension, in the direction of yaw of the first moving object;

associating the second velocity with the first frame;

generating a first particular velocity, along the first dimension, in the direction of yaw of a second moving object associated with the second frame;

associating the first particular velocity with the second frame;

generating a second particular velocity, along the second dimension, in the direction of yaw of the second moving object;

associating the second particular velocity with the second frame;

generating a ratio based on the first velocity, the second velocity, the first particular velocity, and the second particular velocity;

generating a delta yaw value based on an inverse tangent of the ratio.

* * * * *